United States Patent
Evripidou et al.

(10) Patent No.: US 10,095,544 B2
(45) Date of Patent: Oct. 9, 2018

(54) METHOD AND APPARATUS FOR HOSTING A MULTITASKING GUEST ON A HOST SYSTEM

(71) Applicant: Robert Bosch GmbH, Stuttgart (DE)

(72) Inventors: Christos Evripidou, York (GB); Gary Morgan, Thixendale (GB); Alan Burns, York (GB)

(73) Assignee: ROBERT BOSCH GMBH, Stuttgart (DE)

( * ) Notice: Subject to any disclaimer, the term of this patent is extended or adjusted under 35 U.S.C. 154(b) by 253 days.

(21) Appl. No.: 15/215,113

(22) Filed: Jul. 20, 2016

(65) Prior Publication Data

US 2017/0024247 A1    Jan. 26, 2017

(30) Foreign Application Priority Data

Jul. 21, 2015 (EP) ..................... 15177684

(51) Int. Cl.
    *G06F 9/48*     (2006.01)
    *G06F 9/46*     (2006.01)
    *G06F 9/455*    (2018.01)

(52) U.S. Cl.
    CPC ........ *G06F 9/4881* (2013.01); *G06F 9/45558* (2013.01); *G06F 9/46* (2013.01); *G06F 9/4837* (2013.01); *G06F 9/4843* (2013.01); *G06F 2009/45595* (2013.01)

(58) Field of Classification Search
    None
    See application file for complete search history.

(56) References Cited

U.S. PATENT DOCUMENTS 6,567,840 B1 *  5/2003  Binns ................... G06F 9/4887
                                                    718/100
7,369,977 B1    5/2008  Clune et al.

FOREIGN PATENT DOCUMENTS

DE    102012221729 A1    5/2014
EP    0 527 334 A2       2/1993

OTHER PUBLICATIONS

Xi et al., "Real-Time Multi-Core Virtual Machine Scheduling in Xen", Oct. 2014, ACM. (Year: 2014).*
Popek, G.J. et al., Formal requirements for virtualizable third generation architectures, Communications of the ACM, Jul. 1974, 412-421, 17-7.
Zhou, et al. "Supporting Parallel Soft Real-Time Applications in Virtualized Environment", HPDC'13 (2013), New York, NY. pp. 117-118.

* cited by examiner

*Primary Examiner* — Qing Yuan Wu
(74) *Attorney, Agent, or Firm* — Norton Rose Fulbright US LLP; Gerard Messina

(57) ABSTRACT

Method for hosting a multitasking guest on a host system, wherein the guest is allocated a periodic execution server and a deferrable execution server associated with a partition of the system, event-driven tasks of the guest are assigned to the deferrable execution server, time-driven tasks of the guest are assigned to the periodic execution server, a hypervisor of the execution servers is assigned to a first priority group of the system, the deferrable execution server is assigned to a second priority group of the system, the periodic execution server is assigned to a third priority group of the system, and a preemptive task scheduler maintains a descending priority order among the priority groups while the execution servers execute the tasks concurrently.

9 Claims, 1 Drawing Sheet

METHOD AND APPARATUS FOR HOSTING A MULTITASKING GUEST ON A HOST SYSTEM

CROSS REFERENCE

The present application claims the benefit under 35 U.S.C. § 119 of European Patent Application No. EP 15177684.6 filed on Jul. 21, 2015, which is expressly incorporated herein by reference in its entirety.

FIELD

The present invention pertains to a method for hosting a multitasking guest on a host system. The present invention further pertains to corresponding apparatus, a corresponding computer program as well as a corresponding storage medium.

BACKGROUND INFORMATION

Throughout computer science, by hypervisor or virtual machine monitor (VMM) is meant a piece of computer software, firmware, or hardware that creates and runs virtual machines, as described in Gerald J. Popek and Robert P. Goldberg. 1974. Formal requirements for virtualizable third generation architectures. Commun. ACM 17, 7 Jul. 1974, 412-421. In this context, a computer system on which a hypervisor is running one or more virtual machines is defined as a host, whereas each virtual machine is called a guest.

German Patent Application No. DE 102012221729 A1 describes a composite system of motor vehicle computing units in different motor vehicles for the processing of computational tasks by means of an optional hypervisor. The composite system includes one or more motor vehicle computing units in a first motor vehicle, one or more motor vehicle computing units in a second motor vehicle, and at least one control center unit configured to transmit a first computational task to one motor vehicle computing unit of the one or more motor vehicle computing units in the first motor vehicle and to transmit a second computational task to one motor vehicle computing unit of the one or more motor vehicle computing units in the second motor vehicle, wherein the one motor vehicle computing unit of the one or more motor vehicle computing units in the first motor vehicle is configured to process the first computational task and the one motor vehicle computing unit of the one or more motor vehicle computing units in the second motor vehicle is configured to process the second computational task.

SUMMARY

The present invention provides a method for hosting a multitasking guest on a host system, corresponding apparatus, a corresponding computer program as well as a corresponding storage medium.

An embodiment of the present invention may have the advantage that the proposed scheduling approach allows for guests to exhibit both time-driven and event-driven behavior using the execution servers. Specifically, the use of deferrable servers allows for a minimal interrupt latency, if the server parameters are chosen to guarantee that there is always enough capacity to handle events, given their real-time characteristics.

Advantageous refinements of and improvements are described herein. For instance, in the case of event-driven tasks, it may be provided that the execution time is monitored using a watchdog, in order to ensure temporal isolation if a faulty guest fails to signal completion.

BRIEF DESCRIPTION OF THE DRAWINGS

Embodiments of the present invention are illustrated in the FIGS. and are explained in more detail below.

Similar reference characters denote corresponding features consistently throughout the figures.

DETAILED DESCRIPTION OF EXAMPLE EMBODIMENTS

Embodiments of the present invention use a server-based approach in order to achieve the identified advantages by exploiting the timing characteristics of the guests.

From a scheduling point of view, a guest is considered as a set of tasks. Tasks can be either event-driven or time-driven and correspond both to interrupt-driven and to scheduled threads of control in an operating system. The following information is collected from event-driven tasks: Minimum inter-arrival time T, worst case execution time C, global priority level P, and partition p. The following information is collected from time-driven tasks: Period T, worst case execution time C, local priority level P, and partition p.

Each guest is allocated two execution servers: one deferrable server and one periodic server. Both types of server have a set maximum capacity $\hat{C}$ and a period $\hat{T}$. A server's capacity is the amount of CPU time available for its allocated tasks, over its period. Each server's capacity is replenished at the start of its period, by the hypervisor. The server replenishment tasks are considered as hypervisor tasks and run at the highest priority level, without requiring an execution server.

Figure 1:
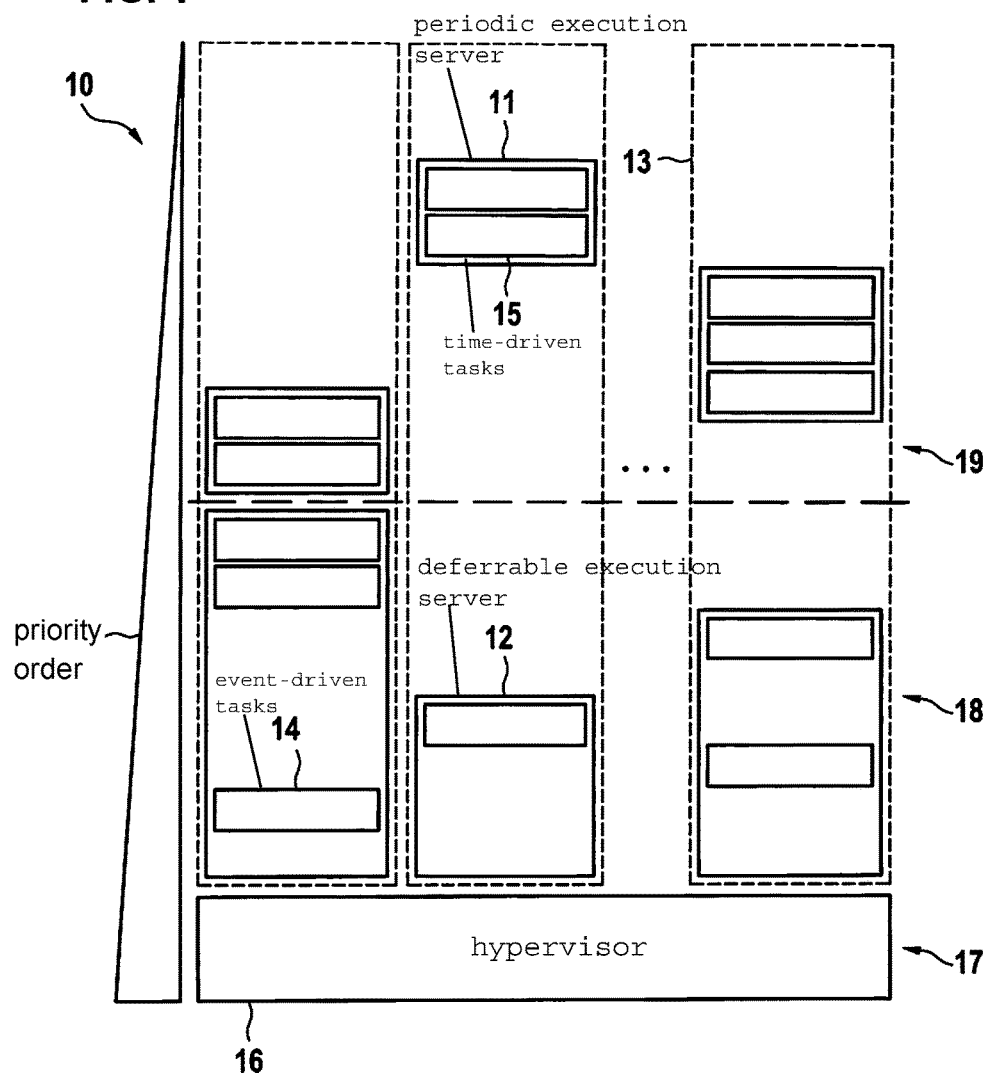
FIG. 1 shows the priority groups of a method according to a first embodiment.

FIG. 1 shows an example with the three priority groups 17, 18, 19 in the system 10. Tasks of the hypervisor 16 are executed at the highest priority level without preemption. The priority levels of event-driven tasks 14 are strictly lower than the priority level of the tasks of the hypervisor 16. Event-driven tasks 14 associated with different partitions 13 are allowed to have overlapping priority levels. The priority levels of time-driven tasks 15 are strictly lower than event-driven tasks 14 and tasks of the hypervisor 16. No overlap is allowed in the priority levels of time-driven tasks 15 of different guests. The scheduling of the tasks 14, 15 is performed using a fixed priority pre-emptive scheduler.

On arrival of an interrupt that corresponds with the release of an event-driven task 14, the hypervisor 16 is called to determine which guest the event is to be serviced by. Once the event's target guest is determined, it is scheduled for execution as an event-driven task 14 using the deferrable execution server 12 that corresponds to the guest. An event-driven task 14 is allowed to execute if the CPU's priority level is less than its own and the capacity of its deferrable execution server 12 has not been depleted. The remaining capacity of the deferrable execution server 12 is updated by the hypervisor 16 on every context switch. Additionally, a watchdog may be employed to ensure that an event-driven task 14 does not exceed the capacity of its deferrable execution server 12. After the guest finishes handling the event it performs a call to the hypervisor 16 to signal completion. The capacity of the deferrable execution servers 12 is only used up for the amount of time that they are being used for servicing their corresponding event-driven tasks 14.

Time-driven tasks 15 are handled using periodic execution servers 11. Therefore, a time-driven task 15 is allowed to execute if its corresponding periodic execution server 11 is running and it has the highest local priority level of all the ready time-driven tasks 15 of that guest. The capacity of a periodic server 11 is used while it is serving time-driven tasks 15 as well as when it is idle.

Figure 2:
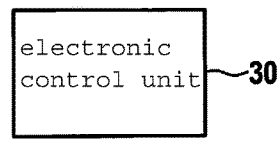
FIG. 2 shows the schematic representation of an electronic control unit according to a second embodiment.

This method may be implemented, for example, in software or hardware or a hybrid of software and hardware, for example in an electronic control unit 30 as illustrated in the schematic diagram of FIG. 2.

What is claimed is:

1. A method for hosting a multitasking guest on a host system, comprising:
    allocating the guest a periodic execution server and a deferrable execution server, wherein the periodic execution server and the deferrable execution server are associated with a partition of the system;
    assigning event-driven tasks of the guest to the deferrable execution server;
    assigning time-driven tasks of the guest to the periodic execution server;
    assigning a hypervisor of the host system in communication with the deferrable execution server and the periodic execution server to a first priority group of the system;
    assigning the deferrable execution server to a second priority group of the system;
    assigning the periodic execution server to a third priority group of the system; and
    maintaining, by a preemptive task scheduler, a descending priority order among the first priority group, the second priority group, and the third priority group while the periodic execution server and the deferrable execution server execute the time-driven tasks and the event-driven tasks concurrently.

2. The method according to claim 1, wherein the time-driven tasks and the event-driven tasks are processed by a central processing unit of the system, and for both the periodic execution server and the deferrable execution server, a utilization of the central processing unit by the time-driven tasks and the event driven tasks assigned to the respective server over a set period of the respective server is limited by a set maximum capacity of the respective server.

3. The method according to claim 2, wherein the scheduler, as needed to preserve the priority order, preempts the event-driven tasks by means of context switches of the central processing unit and, on every context switch, the hypervisor depletes the remaining capacity based on the utilization.

4. The method according to claim 2, wherein each event-driven task and time-driven task is executed on the partition associated with the respective execution server according to a minimum inter-arrival time, worst-case execution time, and global priority level of the task, and each time-driven task is further restricted to the period of the respective periodic execution server.

5. The method according to claim 4, wherein the priority levels of the event-driven tasks mutually overlap the priority levels of further event-driven tasks assigned to a deferrable execution server associated with a further partition of the system.

6. The method according to claim 2, wherein the set maximum capacity is enforced by means of a watchdog timer.

7. The method according to claim 1, wherein the host system is an embedded system and the hypervisor is a type-1 hypervisor.

8. A non-transitory machine-readable storage medium storing a computer program for hosting a multitasking guest on a host system, the computer program, when executed on a processing unit, causing the processing unit to perform:
    allocating the guest a periodic execution server and a deferrable execution server, wherein the periodic execution server and the deferrable execution server are associated with a partition of the system;
    assigning event-driven tasks of the guest to the deferrable execution server;
    assigning time-driven tasks of the guest to the periodic execution server;
    assigning a hypervisor of the host system in communication with the deferrable execution server and the periodic execution server to a first priority group of the system;
    assigning the deferrable execution server to a second priority group of the system;
    assigning the periodic execution server to a third priority group of the system; and
    maintaining, by a preemptive task scheduler, a descending priority order among the first priority group, the second priority group, and the third priority group while the periodic execution server and the deferrable execution server execute the time-driven tasks and the event-driven tasks concurrently.

9. An electronic control unit adapted to host a multitasking guest on a host system, the electronic control unit configured to:
    allocate the guest a periodic execution server and a deferrable execution server, wherein the periodic execution server and the deferrable execution server are associated with a partition of the system;
    assign event-driven tasks of the guest to the deferrable execution server;
    assign time-driven tasks of the guest to the periodic execution server;
    assign a hypervisor of the host system in communication with the deferrable execution server and the periodic execution server to a first priority group of the system;
    assign the deferrable execution server to a second priority group of the system;
    assign the periodic execution server to a third priority group of the system; and
    maintain a descending priority order among the first priority group, the second priority group, and the third priority group while the periodic execution server and the deferrable execution server execute the time-driven tasks and the event-driven tasks concurrently.

* * * * *